May 14, 1957 — R. E. REEVE — 2,791,964
MILK WITHDRAWAL DEVICE FOR CONTINUOUS MILKING SYSTEMS
Filed Jan. 18, 1954

INVENTOR
Robert E. Reeve
BY
Webster & Webster
ATTYS

United States Patent Office
2,791,964
Patented May 14, 1957

2,791,964

MILK WITHDRAWAL DEVICE FOR CONTINUOUS MILKING SYSTEMS

Robert E. Reeve, Tracy, Calif.

Application January 18, 1954, Serial No. 404,442

1 Claim. (Cl. 103—4)

The present invention relates generally to dairy equipment, and particularly to improvements in a vacuum actuated, continuous type milking system which includes a milk delivery pipe leading from adjacent the milking stations to a central receiving point; the latter usually being in a separate enclosure.

The milk delivery pipe, maintained under vacuum, receives the milk from the several teat cups units, and delivers it in the direction of a vacuum pump which is connected in communication with a remote end of such pipe. In such a system it is requisite that a device be provided to withdraw the milk from such milk delivery pipe before the milk reaches the vacuum pump, but which withdrawal must be accomplished without breaking the vacuum in the milk delivery pipe.

It is therefore the major object of the present invention to provide a novel milk withdrawal device, for the purpose described above, which is of novel construction and function.

Another important object of the present invention is to provide a milk withdrawal device, for use in connection with the milk delivery pipe of a continuous milking system, which includes a normally closed milk receiving tank connected in communication between the milk delivery pipe and the vacuum pump conduit; the connections being such that the milk delivers from such pipe into the tank without possibility of the milk gaining entry into the vacuum pump conduit, and there being a milk pump connected to the bottom of the tank adapted to recurringly pump a quantity of milk out of the tank without breaking the vacuum in the latter.

An additional object of the invention is to provide a milk withdrawal device, as in the preceding paragraph, wherein novel float actuated switch means is provided in association with the tank and arranged to cause actuation of the milk pump whenever the milk in the tank reaches a predetermined level.

A further object of the invention is to provide a milk withdrawal device wherein the tank includes initially separate cover or closure parts at the top, and such parts being held in place by the vacuum within the tank; effective seals being provided between such parts in order to prevent air entry into the tank, with resultant vacuum loss.

It is also an object of the invention to provide a milk withdrawal device, for the purpose described, which is designed for ease and economy of manufacture, installation, and operation.

Still another object of the invention is to provide a milk withdrawal device which is practical, reliable, and durable; yet exceedingly effective for the purpose for which it is designed.

These objects are accomplished by means of such structure and relative arrangement of parts as will fully appear by a perusal of the following specification and claim.

Figure 1:
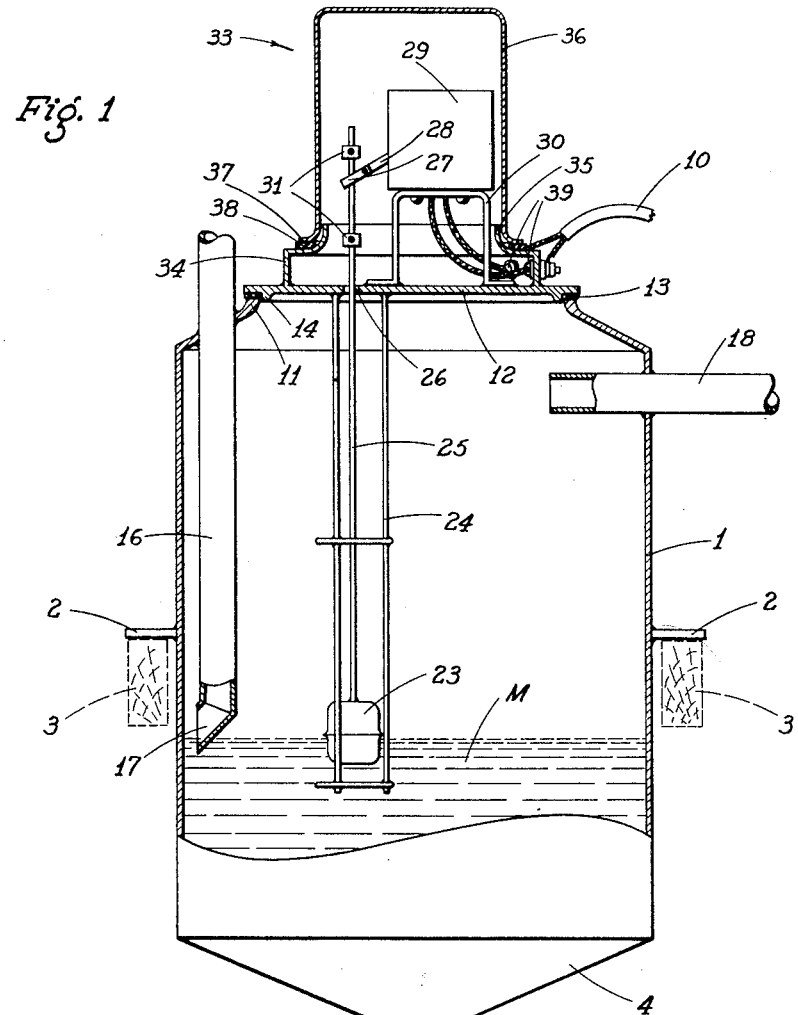
Fig. 1 is a side elevation, mainly in section, of the milk withdrawal device.

Referring now more particularly to the characters of reference on the drawings, the novel milk withdrawal device comprises a vertically elongated, cylindrical milk receiving tank 1 provided—on opposite sides—with laterally outwardly projecting brackets 2 which rest on transversely spaced frame supports or stringers 3.

The bottom 4 of the tank is dished or funnel-shaped, and at the center connects with one end of a milk withdrawal pipe 5 which has a check valve 6 interposed therein; the other or outer end of the milk withdrawal pipe 5 being connected to a milk pump 7 whose discharge 8 feeds to the milk processing equipment (not shown) in the dairy.

The milk pump 7 is driven by an electric motor 9 whose energizing circuit is shown at 10, and which is controlled in the manner as will subsequently appear.

At the top the tank 1 is formed with an initially open, relatively wide annular mouth 11 which is normally closed by a circular cover disc or plate 12; there being an annular seal 13 between the mouth 11 and the peripheral portion of the cover plate 12. Such cover plate 12 also includes a depending annular flange 14 which extends into the mouth 11 whereby to locate the cover plate 12 on the tank 2.

The milk delivery pipe of a continuous milking system is indicated at 15; such pipe being connected, adjacent the milking stations, to the teat cup units (not shown), and thence such pipe leads to the milk withdrawal device which is the subject of the present invention.

At the milk withdrawal device, the milk delivery pipe 15 is formed with a down-turned or depending leg 16 which extends into the tank 1 from the top and to one side of the mouth 11 and cover plate 12. The depending leg 16 is of such length that it extends into said tank 1 to a termination a substantial distance below the top of the tank but above the bottom. At its lower end the depending leg 16 is turned laterally outwardly, as at 17, whereby to discharge against the adjacent wall of the tank 1, and which is for the purpose of minimizing turbulence or splatter of the milk in said tank.

A horizontal, vacuum conduit 18 enters the tank 1 on the side opposite the depending leg 16 of the milk delivery pipe, and at a point immediately adjacent the top of such tank.

Exteriorly of the tank 1 the conduit 18 connects to a vacuum pump 19 driven by an electric motor 20 energized through the medium of a circuit 21 having a control switch 22 interposed therein.

When the milk withdrawal device is in operation the tank 1 is maintained under vacuum by the pump 10, and milk from the delivery pipe 15 discharges relatively continuously into said tank from the discharge end 17 of the leg 16 of said pipe 15. As the inner ends of the depending leg 16 and the vacuum conduit 18 are on opposite sides of the tank 1 and at vertically spaced points, milk which feeds from the lateral discharge end 17 cannot gain access into the vacuum conduit 18, which would be highly undesirable. Additionally, the quantity of milk M delivered into the tank 1 is prevented against rising above a predetermined level in such tank, and which level is considerably below the vacuum conduit 18; this being accomplished by recurrently operating the milk pump 7 to withdraw milk from the tank 1, feeding such milk through the discharge pipe 8.

The check valve 6 opens whenever the milk pump 7 is in operation, but automatically closes to prevent back-flowing of milk or air into the tank 1 when the pump 7 is out of operation.

The following switch means responsive to the level of the milk M in tank 1, is employed in connection with the energizing circuit 10, and for the purpose of controlling the electric motor 9 which drives the milk pump 7:

A float 23 is carried in the tank 1 within an open guide cage 24 which is secured to and depends from the cover plate 12; such float moving up or down with rise or fall of the level of the milk M in tank 1.

The float 23 is secured to the lower end of an upwardly projecting or vertical rod 25 which passes through a hole 26 in the cover plate 12; the rod extending some distance above said cover plate and passing through an eye 27 on the end of a vertically movable switch control arm 28 which projects laterally outwardly from a switch unit 29 supported on a pedestal 30 fixed to the top of the cover plate 12.

Figure 2:
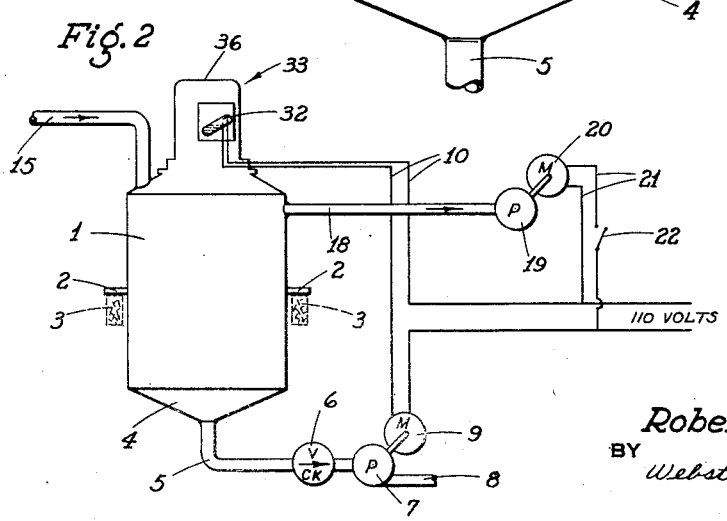
Fig. 2 is a diagrammatic elevation of the same including the vacuum pump and milk pump, together with the related energizing circuits.

Vertically spaced collars 31 are adjustably secured to the upper end portion of the rod 25, one collar being above and the other collar being below the eye 27 on the switch control arm 28. The switch within the unit 29 is shown, diagrammatically at 32 in Fig. 2; such switch preferably being of mercury type.

The collars 31 are set on the rod 25, so that when the milk M raises to a predetermined level in the tank 1, with resultant upward travel of the float 23 and rod 25, the lowermost collar 31 engages the eye 27 and swings the switch control arm 28 upwardly. This closes the switch 32, whereupon the circuit 10 energizes the motor 9 which drives the milk pump 7; milk thence being pumped out of the tank through the pipe 8.

After a quantity of the milk has thus been pumped from the tank 1, resultant lowering of the float 23 and rod 25 causes the uppermost collar 31 to engage the eye 27, swinging the switch control arm 28 downwardly, opening the switch 32, whereupon the circuit 10 is deenergized, stopping the electric motor 9 and milk pump 7.

Thus, with the described milk level responsive switch control mechanism, the milk M in tank 1 is always maintained between a predetermined maximum and minimum level; the maximum level being below the vacuum conduit 18, and the minimum level being a distance above the bottom of the tank. As a consequence, the tank 1 is always maintained under vacuum by the vacuum pump 19, which vacuum also persists in the milk delivery pipe 15 during operation of the continuous milking system.

In order to prevent opening of the tank 1 to atmosphere by reason of the hole 26 through which the rod 25 works, the switch mechanism atop the cover plate 12 is confined within an air-tight bonnet assembly, indicated generally at 33, and which is constructed as follows:

An annular upstanding neck 34 is formed on the cover plate 12 in surrounding relation to the rod 25 and pedestal 30; such neck including—about its periphery—an upwardly and inwardly curved annular flange 35. The switch unit 29 and the adjacent portion of the rod 25 are surrounded by a bonnet 36 which is formed, at its open lower end, with an outwardly and downwardly curved, annular flange 37 disposed in cooperative relation to the flange 35; there being an annular seal 38 between said flanges 37 and 35.

The vacuum existent within the tank 1 also exists within the bonnet assembly 33 by reason of the intercommunicating hole 26; the result being that the bonnet 36 is suctionally maintained in place on the neck 34, and in turn the cover plate 12 is similarly maintained in closed relation to the mouth 11. However, when the device is out of operation, with no vacuum in the tank 1, the bonnet 36, as well as the cover plate 12, can be readily removed for servicing of the mechanism, cleansing of the tank, etc.

Air-tight entry of the energizing circuit 10 into the bonnet assembly 33 is accomplished by using insulated terminals 39 which extend through the neck 34 in spaced relation, one of said terminals being interposed in each of the leads of circuit 10, as clearly shown in Fig. 1.

With the described device, milk from the milk delivery pipe of a continuous, vacuum actuated, milking system can be effectively withdrawn, without breaking the vacuum in the system, and in a manner which assures against any of the milk gaining access to the vacuum pump with which the milk delivery pipe is connected in communication.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a continuous milking system which includes an upstanding tank initially open on top and having milk delivery and discharge pipes connected thereto in spaced relation, means to maintain the tank under constant vacuum, a pump connected to the discharge pipe, a motor for driving the pump, a circuit for the motor and including a switch, and milk-level responsive means to open and close the switch and operatively connected thereto; means mounting the switch on the tank and comprising a cover plate removably seated on and closing the open top of the tank, a pedestal on the cover plate on which the switch is supported, said switch opening and closing means including a rod depending from the switch through a clearance opening in the cover plate and a float on the lower end of the rod; a continuous neck on and upstanding from the cover plate, the motor circuit comprising leads extending between the switch and motor and including air-tight insulated terminals in the neck, an air-tight bonnet over the switch removably seated on the neck, and seals disengageably disposed between the neck and bonnet and between the cover plate and tank.

References Cited in the file of this patent
UNITED STATES PATENTS

| | | |
|---|---|---|
| 1,518,890 | Aikman | Dec. 9, 1924 |
| 2,054,205 | Palmer | Sept. 15, 1936 |
| 2,496,467 | Griffith | Feb. 7, 1950 |
| 2,725,850 | Makous | Dec. 6, 1955 |

OTHER REFERENCES

De Laval Combine Milking System (Model F), Nov. 14, 1950, (page 14).